June 24, 1969  R. D. BARNES  3,451,156
FISHING ROD HANDLE
Filed July 5, 1966
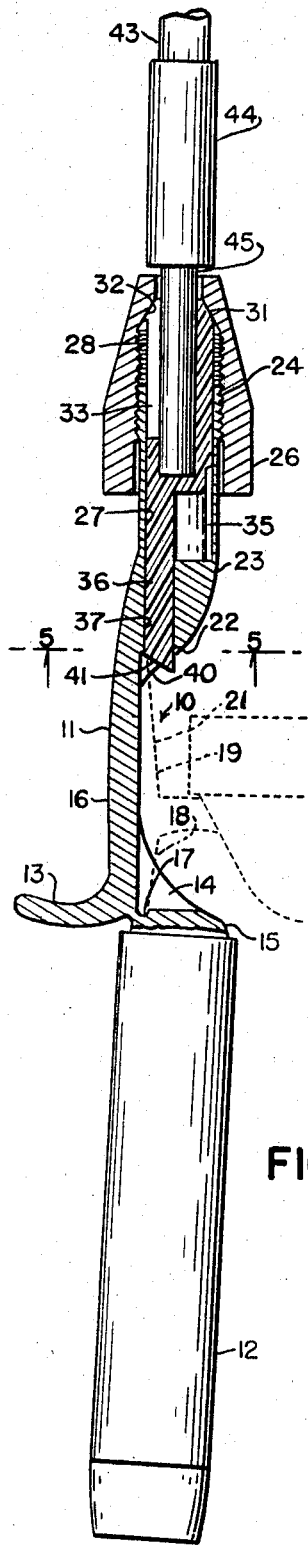
FIG. 1
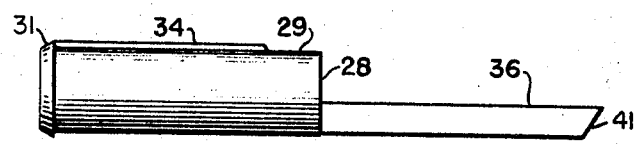
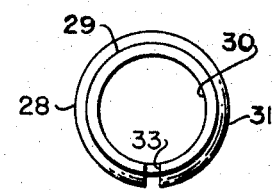
FIG. 3
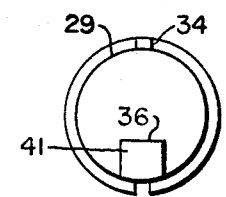
FIG. 4
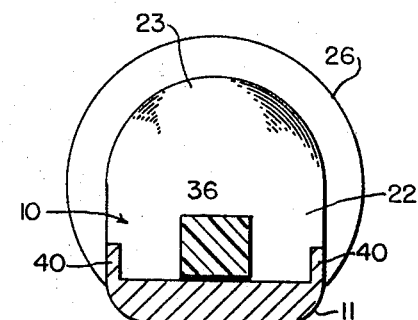
FIG. 5
INVENTOR:
RICHARD D. BARNES
BY
ATTORNEY United States Patent Office 3,451,156
Patented June 24, 1969

3,451,156
FISHING ROD HANDLE
Richard D. Barnes, Santa Ana, Calif., assignor to The Conolon Corporation, a corporation of California
Filed July 5, 1966, Ser. No. 562,575
Int. Cl. A01k 87/06, 87/00
U.S. Cl. 43—22       3 Claims

ABSTRACT OF THE DISCLOSURE

A fishing rod handle having a unitary chuck mounted on the front portion of the handle and which cooperates with a collet located in a bore within the handle's front portion to secure both the rod and the reel to the handle. The collet has a hollow cylindrical forward portion for receiving a fishing rod and also has a spline which slidably cooperates with a groove in the bore. The collet's rearward portion has a tang of non-circular cross-section extending rearwardly and off-center from the bore and is slidably received in a passage of similar cross-section joining the bore and the handle's reel seat portion.

---

This invention relates in general to dismountable fishing rods and more particularly to a fishing rod handle which has a reel and a rod fixed thereto.

A main object of this invention is to provide a fishing rod handle to which a rod and reel may be secured by a single locking means.

Another object of the invention is to provide a fishing rod handle for a dismountable fishing rod which is simple in construction, requires fewer parts, and is less expensive to manufacture.

A further object of this invention is to provide a fishing rod handle which may secure reels having varied bases without any special adjustment.

Yet another object of this invention is to provide a more rapidly and easily assembled fishing rod.

Many other objects, advantages, and features of invention reside in the particular construction, combination, and arrangement of parts involved in the invention as will be understood from the following description and accompanying drawings wherein:

FIG. 1 is a side view, partly broken away in section, of a fishing rod handle according to this invention with a reel shown in dotted lines fixed thereto and a ferrule mounting a fragment of a rod fixed therein;

FIG. 2 is a side view of a rod holding and reel clamping collet according to the invention;

FIG. 3 is a front view of the collet of FIG. 2;

FIG. 4 is a rear view of the collet of FIG. 2; and

FIG. 5 is a section taken on line 5—5 of FIG. 1.

Referring to the drawing in detail, the fishing rod handle of this invention has a reel holding or cradle portion generally indicated by the reference numeral 10. This reel holding portion 10 is formed on top of the metal frame 11 which has a hand grip 12 of cork or other material fixed about its rearmost portion 15 in a conventional manner. A trigger-like finger grip 13 extends downward from frame 11 in front of hand grip 12.

Two side fillets 14 are formed to slope forward from portion 15 to the bottom member 16 of frame 11. A notch 17 is provided to receive the rear end 18 of reel base 19 of a reel 20. The end 18 of reel base 19 is laterally constrained and guided into notch 17 by the fillets 14. The front end 21 of reel base 19 terminates before a surface 22 of front portion 23 of frame 11.

Front portion 23 of frame 11 has an external threaded portion 24 about which chuck 26 is screwed. Front portion 23 contains a cylindrical bore 27 within which collet 28 slidably extends.

Collet 28 has a cylindrical front portion 29 containing a longitudinal bore 30. The front end of portion 29 terminates in a conical collar 31 which is forced rearwardly and compressed by the corresponding conical inner surface 32 of chuck 26. A longitudinal slit 33 extends rearwardly from the front of the cylindrical portion 29. A spline 34 may be formed on top of portion 29 to extend rearwardly from collar 31. Spline 34 extends into a longitudinal groove 35 in bore 27 to help prevent rotation of collet 28 therein.

A rectangular tank 36 extends rearwardly from portion 29 to extend through a corresponding rectangular passage 37 formed in front portion 23 of frame 11. Side fillets 40 may be formed to extend rearwardly from front portion 23 to bottom member 16. Tang 36 terminates in a downwardly and forwardly sloping rear end surface 41.

A fishing rod 43 of fiberglass or any other suitable material may be mounted in a metal ferrule 44 having a solid end 45. The rod of this invention is assembled by inserting end 45 in the bore 30 of collet 28 and slipping the base 19 of a reel 20 in the cradle portion 10 of frame 11. Chuck 26 is then screwed further onto front portion 23 to slide collet 28 rearwardly. This moves surface 41 against the front portion 21 of reel base 19 to slide reel base 19 rearwardly. When the end 18 of reel base 19 seats in notch 17, further tightening of chuck 26 causes tank 36 to clamp front end 21 of reel base 19 against bottom member 16 between the fillets 40. Upon additional tightening of chuck 26, tang 36 prevents further rearward motion of collet 28 so that collet 28 is compressed closing slit 33 to grip ferrule end 45 in bore 30. Thus a single action, turning chuck 26, secures a rod 43 and a reel 20 to the fishing rod handle of this invention. In a like manner, turning chuck 26 forward releases the locking force on rod 43 and reel 20 with one single action.

Chuck 26 and frame 11 are preferably made of metal, but collet 28 is best made of nylon or any other suitable plastic. Tang 36 and collet front portion 29 are integrally formed from or molded in one piece. Tang 36 is rectangular in section and slidably extends through a corresponding rectangular passage 37. Thus tang 36 helps resist the considerable forces tending to rotate collet 28 in front portion 23 as chuck 26 is tightened.

Since tang 36 may slide rearwardly for a considerable distance, a wide variety of reel bases 19 of different lengths may be secured in the rod handle of this invention. The pairs of fillets 14 and 40 guide a reel base 19 quickly into its desired position. While rod 43 has been shown secured in a collet 44, a suitably prepared rod 43 may be directly secured in collet 28.

While this invention has been shown and described in the best form known, it will nevertheless be understood that this is purely exemplary and that modifications may be made without departing from the spirit and scope of the invention wherein I claim:

1. A fishing rod handle for a dismountable fishing rod having a rod and a reel with a reel base, said handle having a frame, a hand grip on the rearmost portion of said frame, said frame forming a cradle portion on top of said frame in front of said hand grip, said frame having retaining means in the rearmost end of said cradle portion to receive the end of a reel base, a front portion of said frame extending in front of said cradle portion, said front portion of said frame being externally threaded and containing a cylindrical bore, a collet having a cylindrical front portion extending within the bore of the front portion of said frame and having an integrally formed tang extending rearwardly and off center from said cylindrical front portion of said collet, at least one spline formed on the cylindrical front portion of said collet and at least one spline groove formed along said bore to slidably receive said at least one spline, said front portion of said frame containing a passage extending rearwardly and off center from the bore of said front portion of said frame to said cradle portion, said passage containing said tang which slidably extends therethrough, said tang and said passage being formed to provide complementary non-circular cross-sectional configurations, said tang having a rear surface, said cylindrical front portion of said collet containing a bore to receive a fishing rod and at least one longitudinal slit extending rearwardly from the front of said collet, a conical surface formed on the front of said collet, and a chuck screwed on the threaded front portion of said frame, said chuck having a conical inner surface so that turning said chuck forces said collet rearwardly until the rear surface of said tang clamps a reel base in said cradle portion between said notch and said rear surface of said tang and said conical inner surface of said chuck compresses said conical surface and thereby said collet thus fixing said fishing rod within the bore of said collet.

2. The combination according to claim 1 wherein said rear surface of said tang slopes downwardly and forwardly.

3. The combination according to claim 2 with the addition of a pair of fillets extending from the rearmost portion of said frame to the sides of said cradle portion on each side of said retaining means.

References Cited

UNITED STATES PATENTS

| | | | |
|---|---|---|---|
| 1,920,966 | 8/1933 | Carlson | 43—22 |
| 1,962,869 | 6/1934 | Heddon | 43—23 X |
| 2,057,535 | 10/1936 | McKechnie | 43—22 |
| 2,421,240 | 5/1947 | Camburn | 43—22 |
| 2,593,747 | 4/1952 | Godfrey | 43—22 |
| 2,756,531 | 7/1956 | Hollenshead | 43—22 |
| 3,181,264 | 5/1965 | De Simone | 43—22 |

SAMUEL KOREN, *Primary Examiner.*

JAMES H. CZERWONKY, *Assistant Examiner.*

U.S. Cl. X.R.

43—23